May 3, 1932. R. N. COLLEY 1,857,042
WINDSHIELD WIPER
Filed April 24, 1930 2 Sheets-Sheet 1

Inventor
R. N. Colley.
By [signature]
Attorney

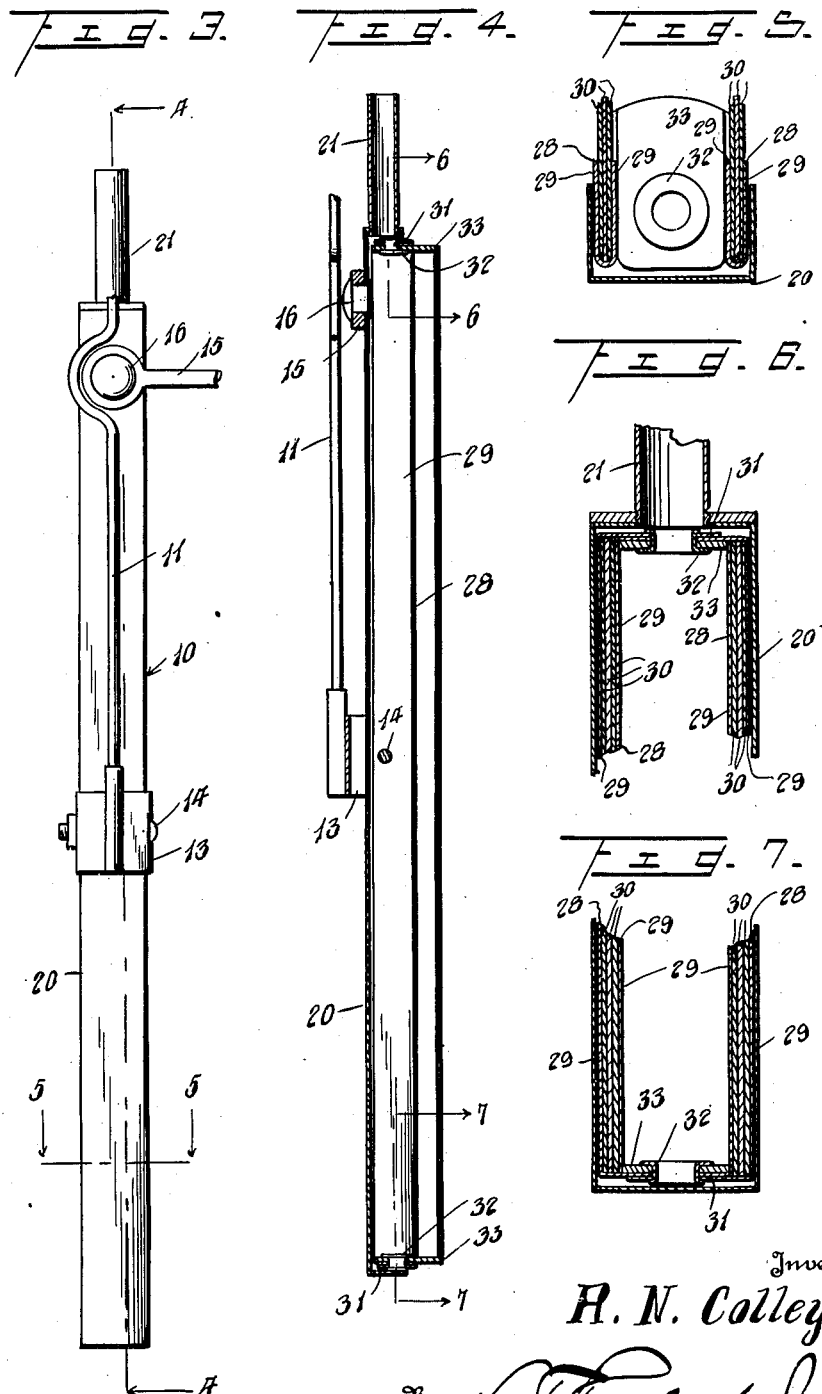

Patented May 3, 1932

1,857,042

UNITED STATES PATENT OFFICE

REUBEN N. COLLEY, OF PROVIDENCE, RHODE ISLAND

WINDSHIELD WIPER

Application filed April 24, 1930. Serial No. 447,047.

This invention relates to a windshield wiper and aims to provide a generally improved construction which will heat the windshield, causing frozen matter to thaw and which will also evaporate the moisture by hot air.

Another object is to provide a novel construction operated from the exhaust line of an automobile.

A further object is to provide a novel construction of wiping element and connecting means for the parts thereof which will permit passage of the hot air therethrough.

Various additional objects and advantages will become apparent from a consideration of the description following taken in connection with accompanying drawings illustrating an operative embodiment.

In said drawings:—

Figure 1:
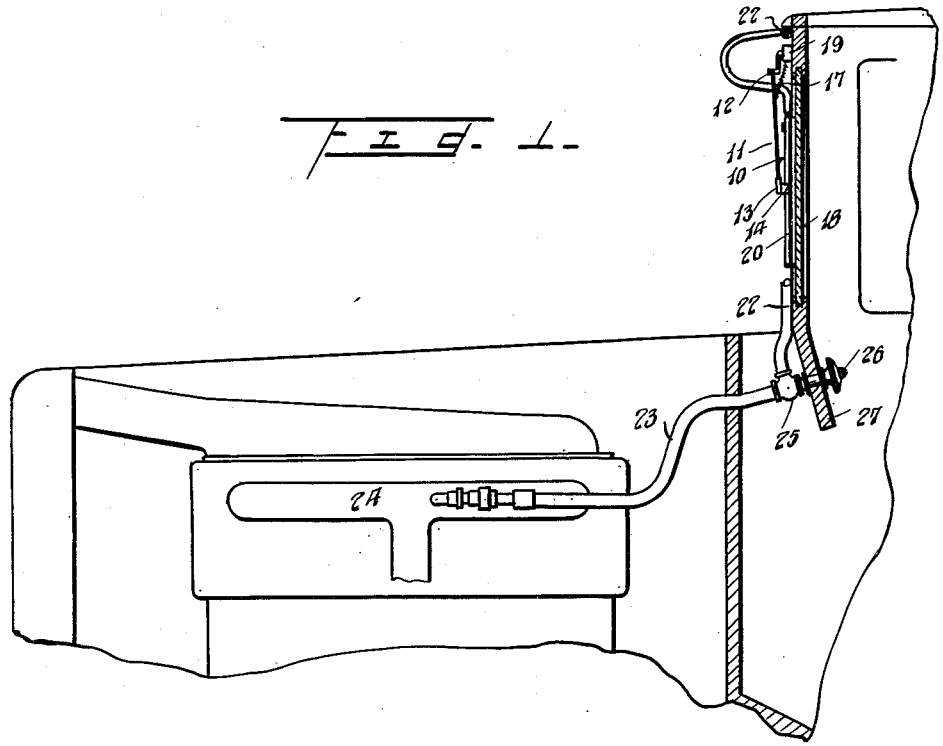
Figure 2:
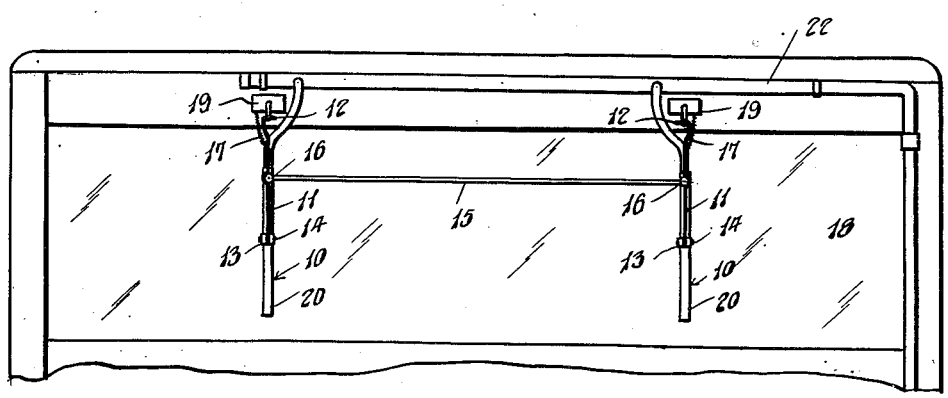

Figure 1 is a view showing an automobile fragmentarily and in longitudinal section, with my improvements in place, Figure 2 is a front elevation of an automobile windshield showing my improvements in place, Figure 3 is a front elevation of one of the windshield wipers, Figure 4 is a sectional view taken on the line 4—4 of Figure 3, Figure 5 is a cross sectional view taken on the line 5—5 of Figure 3, Figure 6 is a cross sectional view taken on the line 6—6 of Figure 4, and Figure 7 is a cross sectional view taken on the line 7—7 of Figure 4.

Referring specifically to the drawings, wherein like reference characters designate like or similar parts, 10 designates windshield wipers from each of which extends a supporting arm 11 having a hook 12 at its top loosely suspending the wipers 10 for movement substantially in the paths of semicircles. The arms 11 have brackets 13 straddling the wipers and fastened thereto by removable bolts 14. In order that the wipers may move in unison, a connecting rod 15 is pivotally connected to them as at 16. Contractile coil springs 17 are attached to the arms 11 so as to normally maintain the wipers in contact with the windshield shown at 18. Preferably the springs 17 are fastened to the casing of suitable motors 19, which are the same elements that are engaged by the hooks 12.

It will be obvious that in lieu of the pair of windshield wipers, a single one or any desired number may be employed as preferred. Accordingly it will suffice to specifically describe a single one of the windshield wipers. Each wiper comprises a rectangular casing 20 from one end of which a nipple 21 extends having connection with a flexible hose 22 which is arranged in communication with a pipe or conduit 23 communicating with the exhaust manifold 24 of an internal combustion engine. As a result of the action within the exhaust manifold, motors 19 operate the windshield wipers and heated air is discharged against the windshield. At the junction of the pipes 22 and 23, a valve 25 is provided under manual control of a knob or the like 26 located at the instrument board 27, for ready manipulation to control the operation of the windshield wipers.

Located within the casing 20 is a wiper member 28. Such member 28 is preferably made of a frame of sheet metal consisting of two frame sections or strips 29 arranged in parallelism as best shown in Figures 5, 6 and 7. Such members 29 in cross section are of U-shape and clinch or clamp between them a plurality of flexible wiper strips 30, for instance three in number, the middle one of which preferably extends slightly beyond the others at the wiping edge. Each of the members 29 has a laterally extending tongue 31 at each end. The tongues 31 overlap and are connected together by hollow rivets 32 suitably clinched thereto. The bolt 14 passes through the members 29 and 30 and thus rockably mounts the frame 28 in place, slightly spacing it from the walls of the casing in order that the heated air may have free passage and circulation. The hollow rivets 32 also provide conduits for the passage of the heated air therethrough and hence do not form obstructions. Attention is called to the fact that the rivets 32 also secure end members 33 in place, such end members 33 preferably being of rubber or yielding material and bridging the flexible members 30 so as to form substantially a housing or closed chamber into which the heated air is discharged.

As a result of the construction described, the hot air passes into the casing 20 from the exhaust manifold 24 through the conduits 23 and 22 under control of valve 25. Such heated air in the casing 20 passes around the frame 28 and through the eyelets 32 so that the same will be confined by the flexible elements 30 and 33 and will serve to melt ice on the windshield and dry moisture.

Various changes may be resorted to provided they fall within the spirit and scope of the invention as claimed.

I claim as my invention:—

1. A windshield wiper of the class described having a pair of parallel strips, flexible wiper elements carried by said strips, tongues at the opposite ends of said strips, means connecting said tongues of one strip with the tongues of the other strip to thereby provide a rectangular wiper frame, flexible elements bridging the flexible wiper elements adjacent said tongues and secured in place by the said means, said means being hollow to form conduits for hot air and means for conducting hot air to said hollow means.

2. A windshield wiper comprising a casing, means for supplying hot air to the casing, a pair of parallel strips within the casing, flexible wiper elements secured to said strips, tongues at the opposite ends of said strips, the tongues of one strip overlapping the tongues of the other strip, hollow eyelets connecting the tongues together and constituting conduits for conducting the hot air from the casing to the space between the wiper elements, flexible elements bridging the flexible wiper elements and secured in place against the tongues by said hollow eyelets, the strips and flexible elements thereby providing a rectangular wiper frame, a supporting arm for the wiper, and an element securing the supporting arm to the casing and pivotally mounting said wiper frame in the casing.

In testimony whereof I affix my signature.

REUBEN N. COLLEY.